United States Patent [19]

Savage

[11] 4,187,687
[45] Feb. 12, 1980

[54] SYSTEM FOR UTILIZING SOLAR ENERGY AND AMBIENT AIR IN AIR CONDITIONERS DURING THE HEATING MODE

[76] Inventor: Harry A. Savage, Bellwood, Rt. #2, Box 41, Greenwood, Ark. 72936

[21] Appl. No.: 869,799

[22] Filed: Jan. 16, 1978

[51] Int. Cl.² .............................................. F25B 27/00
[52] U.S. Cl. .......................................... 62/2; 62/179; 62/238; 237/2 B
[58] Field of Search ................. 165/154, 143; 62/515, 62/2, 179, 238 E, 324 B; 237/2 B

[56] References Cited

U.S. PATENT DOCUMENTS

| | | | |
|---|---|---|---|
| 2,816,738 | 12/1957 | McElgin | 165/154 X |
| 2,877,991 | 3/1959 | Warrington, Jr. | 62/515 X |
| 2,999,310 | 4/1961 | Nicholson | 165/154 X |
| 3,034,315 | 5/1962 | Coblentz | 62/515 X |
| 3,129,077 | 4/1964 | Adams | 165/143 X |
| 3,151,672 | 10/1964 | Edmund | 165/154 X |
| 3,907,032 | 9/1975 | Degroote et al. | 165/143 X |
| 4,012,920 | 3/1977 | Kirschbaum | 237/2 B X |

*Primary Examiner*—William F. O'Dea
*Assistant Examiner*—William E. Tapolcai
*Attorney, Agent, or Firm*—Salvatore G. Militana

[57] ABSTRACT

A system for utilizing solar energy efficiently in air conditioning systems during the heating mode having at the evaporator heat exchange means which extracts the heat from ambient air when the latter is greater than 47° F. and from solar heated fluid when the ambient air is less than 47° F.

3 Claims, 2 Drawing Figures

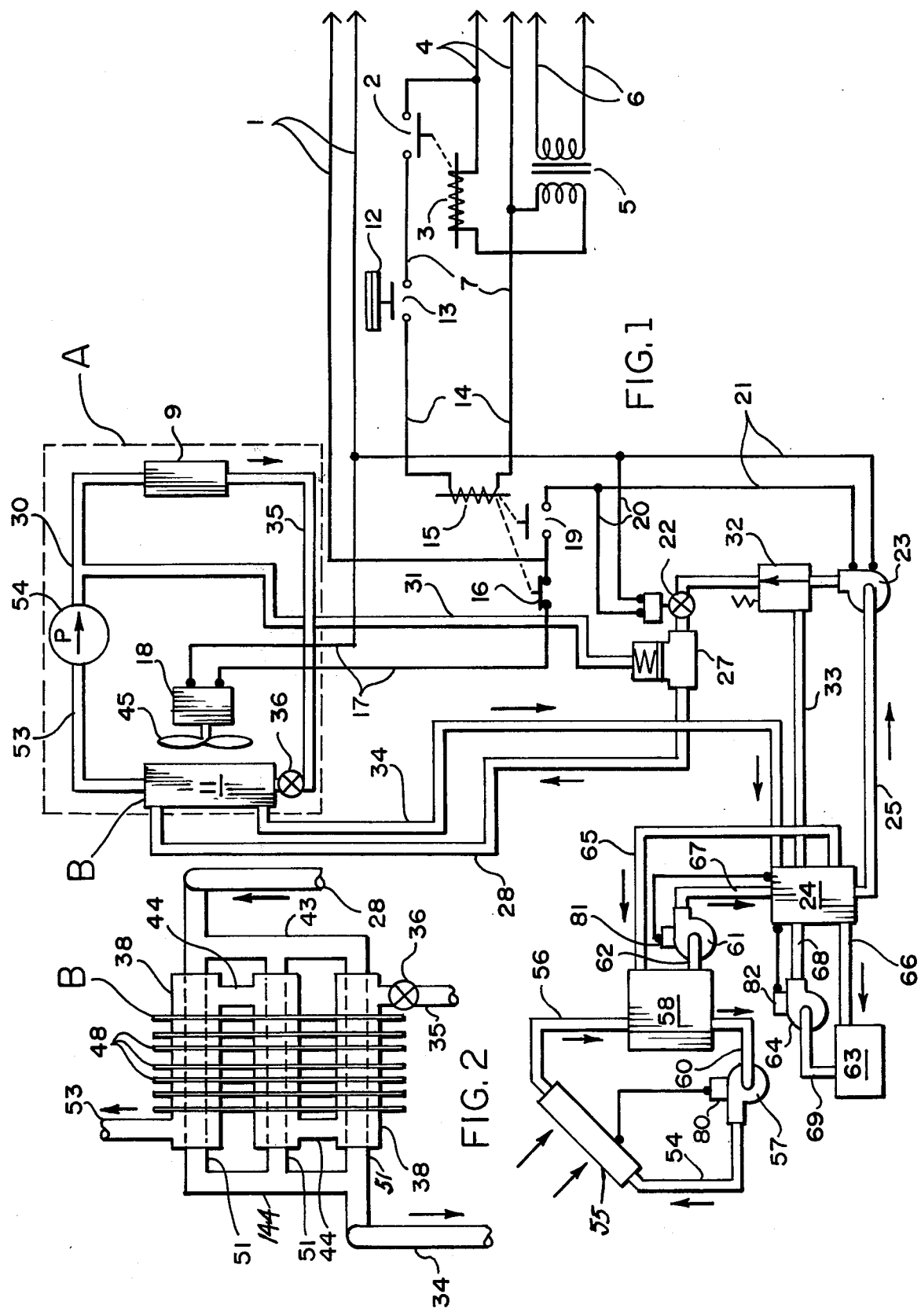

4,187,687

SYSTEM FOR UTILIZING SOLAR ENERGY AND AMBIENT AIR IN AIR CONDITIONERS DURING THE HEATING MODE

BACKGROUND OF THE INVENTION

1. Field of the Invention

This invention relates to a heating system and is more particularly directed to a heat pump system of an air conditioner that extracts heat from ambient air when the latter is over 47° F. and automatically shifts to fluid heated by a solar collector when the ambient air is less than 47° F.

2. Description of the Prior Art

The present air conditioning systems which utilize both ambient air and solar heated fluid for providing heat to refrigerant during the heating mode are found to be both complicated and expensive in cost and inefficient in operation. None of the present air conditioning systems utilize a heat exchanger in its heat pump system that transfers to the refrigerant heat taken directly either from solar heated fluid or ambient air depending upon whether ambient air is less than 47° F. or above said temperature respectively, at which temperatures the heat pump is operating at a high coefficient of performance.

Some air conditioning systems that use solar heated fluid during the heating mode use the heated fluid to heat air which is then blown into the heat exchanger to give up its heat to the refrigerant. Other air conditioning systems store the heated fluid in large tanks to collect same and have it available when the ambient air drops to below 47° F. Both of these systems are inefficient; a great deal of heat of the solar heated fluid is lost before arriving at the heat exchanger.

The applicant avoids the above indicated objections to the present systems of utilizing selectively both ambient air and solar heated fluid by having a heat exchanger that is capable of extracting heat directly from ambient air or fluid and transfering the heat directly to the refrigerant and a system for shifting from ambient air to solar heated fluid and vice versa at the critical temperature of 47° F.

SUMMARY OF THE INVENTION

Therefore, a principal object of the present invention is to provide the heat pump system of an air conditioner with a solar collector that provides the heat pump with solar heated fluid when the ambient air temperature is less than 47° F.

Another object of the present invention is to provide the heat pump system of an air conditioner with automatic means for shifting from the use of ambient air when the latter is greater than 47° F. to solar heated fluid when the ambient air drops below 47° F.

A further object of the present invention is to provide a heat pump of an air conditioning system with a heat exchanger that is capable of transferring heat from ambient air or from solar heated fluid.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is a schematic diagram of my system for utilizing selectively solar heated fluid and ambient air in a conventional air conditioner.

FIG. 2 is a detailed view of the heat exchanger contained within the evaporator assembly of the air conditioner.

DESCRIPTION OF THE PREFERRED EMBODIMENT

A disclosure of this invention was filed with the U.S. Patent Office on July 26, 1977, in Disclosure No. 062,722, entitled Evaporator Assembly.

There is shown by FIG. 1, an air conditioner -A- enclosed in dotted lines consisting of a condenser 9, and an evaporator assembly 11 connected together by pipes 53, 30 and 35 with a compressor 54 interposed between the pipes 53, 30 and an expansion valve 36 at the inlet of the evaporator assembly 11 in the pipe 35. A fan 45 operated by a motor 18 when energized directs air against the heat exchanger -B- of the evaporator 11. The remainder of the schematic drawing illustrates my system for the efficient utilization of ambient air as a primary source of heat and solar heated fluid as a secondary source of heat for the air conditioner during the heating mode or cycle of operation.

The evaporator assembly 11 is so constructed that the heat exchange effected therein may be accomplished by the use of ambient air if above 47° F., otherwise by the solar heated fluid delivered thereto. The evaporator assembly 11 consists of a plurality of coaxially mounted tubing 38 and 51, the tubing 51 being connected together at their ends to pipe 28 and 34; pipe 28 permitting the flow of solar heated fluid to the evaporator assembly and pipe 34 returning the fluid back to the solar heating system as is explained in detail hereinafter. The refrigerant becomes vaporized at the expansion valve 36, enters the first of the tubing 38 via the pipe 35, flows thru the other tubing 38 through connecting pipes 44 to be discharged through pipe 53 and returned to the compressor 54. The evaporator assembly 11 is provided with a plurality of fins 48 mounted on the tubing 38. The fan 45 operated by the motor 18 causes a stream of ambient air to flow past the fins 48 so that the extending refrigerant in the tubing 38 may absorb the heat of the ambient air. When the ambient air is colder than 47° F. there will be insufficient heat in the air to permit the air conditioner to operate efficiently. Consequently the heated fluid of the solar collector 55 is permitted to flow through the pipes 51 of the heat exchange of the evaporator assembly 11 as indicated hereinafter.

SOLAR HEAT SYSTEM

The heated fluid flows from the solar collector 55 via pipe 56 to the thermal storage tank 58 and back to the solar collector 55 via pipe 60, pump 57 and pipe 54. The circulation of fluid continues until the temperature of the fluid flowing from the solar collector 55 via line 56 ceases to be more than 5° above the temperature in the thermal storage tank 58. The on-off of the fluid flow is controlled by a temperature differential theremostat 80 that is programmed to cause the pump 57 to operate only when the temperature of the fluid flowing from the solar collector via pipe 56 is at least 5 degrees above the temperature of the fluid thermal storage tank 58.

Fluid tempering tank 24 provides a means to thermally temper the fluid that will transport the heat to the evaporator assembly 11. The heated fluid in the thermal storage tank 58 is moved by pump 61 via pipes 62, 67 to the fluid tempering tank 24 and returns back to the thermal storage tank 58 via the pipe 65. The on-off of the fluid flow between the tank 24 and 58 is controlled by a thermostat 81 to maintain a temperature in the tank 24 between 45° and 52° F.

The auxiliary heater 63 provides means to maintain a temperature of 45° to 50° F. in the tank 24 and is controlled by a thermostat 82 that is programmed to turn on the heater 63 and the pump 64 when the temperature in the tank 24 drops below 45° F. The pump 64 moves the fluid to the auxiliary heater 63 via the pipes 69 and 68 to the tank 24. The fluid is returned to the auxiliary heater 63 via the pipe 66.

USE OF SOLAR COLLECTOR HEATER WATER

When the temperature of the ambient air is less than 47° F. it becomes inadequate for sufficient heat transfer to the evaporator assembly 11; the thermostat 12 closes N.O. (normally opened) contacts 13 to make a 24 V circuit via lines 14 to solenoid coil 15. The solenoid coil 15 opens the N.C. (normally closed) contacts 16 to interrupt a 110 V circuit via lines 17 to motor 18 causing fan 45 to stop and interrupt the flow of ambient air through the evaporator assembly 11. Simultaneously, N.O. contacts 19 closes to make a 110 V circuit via lines 21 to open solenoid valve 22 and start pump 23 and cause the heated fluid in tank 24 to move through pipe 25, solenoid valve 22, pressure actuated valve 27 via pipe 28 to the evaporator assembly 11. The heated fluid enters the heat exchanger -B- through the header 43 and flows through heated fluid tubes 51 to a header 144 and into the pipe 34 and back to the tank 24. The adjustable pressure by-pass valve 32 opens to by-pass excess fluid back via line 33 to tank 24. The pressure actuated valve 27 is actuated by pressure changes in the heat pump refrigerant positive pressure pipe 30 and transfer pipe 31 to the valve 27. When a change in the rate of heat transfer to the refrigerant passing through the evaporator assembly 11 between the inner tubing 51 and the outer tubing 38 occurs, a change in the negative pressure of the refrigerant will also occur in the pipe 53 to cause a change in the positive pressure in the pipes 30 and 31. The positive pressure changes in the pipes 30 and 31 will cause the pressure actuated valve to increase or decrease the flow of heated fluid via the pipe 28 to the evaporator assembly 11. Insufficient heat exchange to the refrigerant will cause a drop of pressure via the pipes 30 and 31 to the pressure actuated valve 27 to cause an increase in the flow of heated fluid to the evaporator. Excessive heat exchange to the refrigerant will cause the pressure actuated valve 27 to reduce the flow of heated fluid to the evaporator assembly 11 via the pipe 28.

USE OF AMBIENT AIR

When the ambient air temperature rises above 47° F., the thermostat 12 opens N.O. contacts 13 to interrupt the 24 V circuit via lines 14 to solenoid coil 15. The solenoid coil 15 causes N.O. contacts 19 to open and interrupt the 110 V circuit via lines 21 to stop pump 23 and close valve 22 to interrupt the flow of heated fluid via the pipe 28 to the evaporator assembly 11. Simultaneously, N.C. contacts 16 close to make a 110 V circuit via lines 17 to motor 18 to cause fan 45 start and establish a flow of air across the evaporator assembly 11. The heat pump system is now in a conventional refrigerant to ambient air mode and will remain so until the ambient drops below 47° F.

It is readily noted by the above description of my system for utilizing solar energy and ambient air in the heating mode of air conditioners, the primary source of heat being ambient air and the secondary source being solar energy whereby a low cost system at a high degree of efficiency is provided.

What I claim as new and desire to secure by Letters Patent is:

1. A system for utilizing solar energy and ambient air in air conditioners during the heating mode comprising the combination of an evaporator assembly for selective heat exchange with heated fluid and ambient air and a solar heat collector system, said evaporator assembly having a plurality of fluid pipes, header means connecting said fluid pipes, said header means having an inlet and an outlet, pump means connected to said inlet, a plurality of refrigerant pipes connected in series and telescopically mounted over said fluid pipes, said refrigerant pipes having an inlet and an outlet, a plurality of fins mounted on said refrigerant pipes, fans means mounted in proximity of said fins for directing ambient air in the direction of said fins, control means operatively connected to said pump means and said fan means for operating said pump means and rendering said fan means inoperative when the ambient air is less than a predetermined temperature and vice versa when the ambient air is above said temperature and said solar heat collector system having solar fluid heater means, a thermal storage tank and a tempering tank, first pump means connecting said solar fluid heater means, said thermal storage tank and said tempering tank and second pump means connecting said tempering tank and said header means inlet and outlet directing heater fluid to and from said heat exchanger.

2. The structure as recited by claim 1 taken in combination with auxiliary heater means connected to said tempering tank for heating the fluid in said tank when the fluid is less than said predetermined temperature.

3. The structure as recited by claim 2 taken in combination with control means operatively connected to said second pump means for controlling the volume of heated fluid flowing from said tempering tank to said heat exchanger as required by said refrigerant.

* * * * *